Jan. 14, 1941.   S. S. BERRY   2,229,009
TESTING APPARATUS FOR STORAGE BATTERIES
Filed March 24, 1939
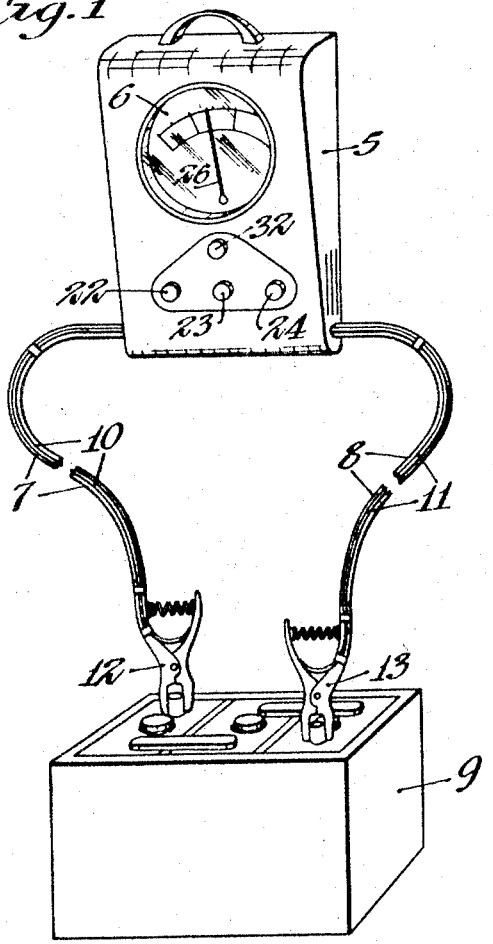
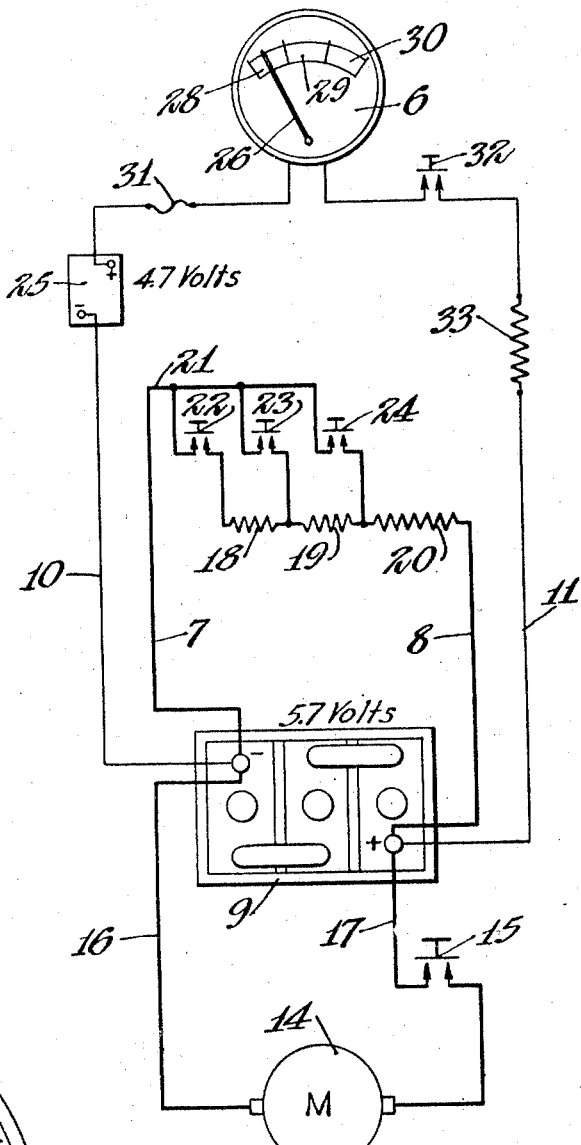
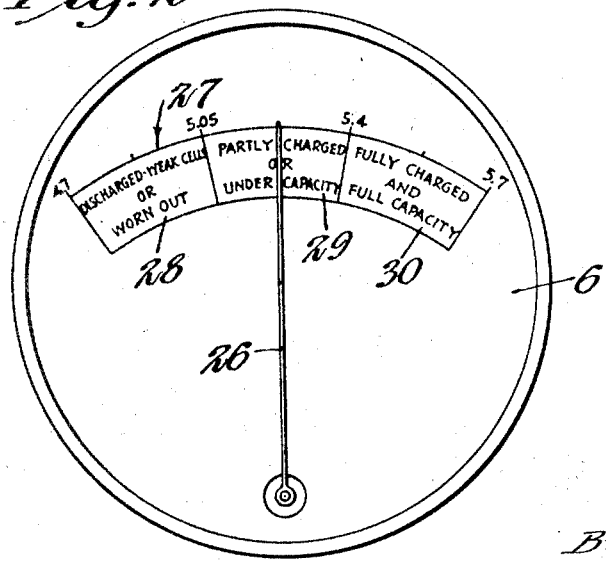
Inventor
Stephen S. Berry
By Stryker & Stryker
Attorneys Patented Jan. 14, 1941

2,229,009

UNITED STATES PATENT OFFICE 2,229,009

TESTING APPARATUS FOR STORAGE BATTERIES

Stephen S. Berry, Akron, Ohio, assignor to National Battery Company, St. Paul, Minn., a corporation of Delaware Application March 24, 1939, Serial No. 263,933

2 Claims. (Cl. 175—183)

It is an object of this invention to provide novel and inexpensive apparatus adapted to facilitate making voltage drop tests of storage batteries of the several capacities commonly used in automotive vehicles.

A particular object is to provide novel apparatus of this class adapted to be connected to the battery terminals without detaching the vehicle circuit cables or removing the battery from the vehicle, the apparatus including a discharge circuit having branches severally including fixed resistances corresponding to the resistances respectively of the several vehicle starter circuits to be tested and also having a voltmeter and circuit whereby voltage drop tests may be applied to any of such vehicle batteries quickly and easily.

Another object is to provide testing apparatus of this class having a voltmeter, the range of which corresponds to the range of voltages between that of fully charged batteries and the voltages of the batteries when in weak or worn out condition, the voltage drop being shown while each battery is being discharged at the normal rate for operation of the vehicle's starter and the voltmeter dial having legends which clearly indicate the condition of the battery to the technically untrained observer.

Other objects will appear and be more fully pointed out in the following specification and claims.

Referring to the accompanying drawing:

Figure 1 is a perspective view showing my improved testing apparatus connected to a storage battery of common type;

Fig. 2 is a front view of the voltmeter dial, and

Fig. 3 is a diagrammatic illustration of my circuits and apparatus for testing batteries of various capacities while discharging each of them at its normal rate for the operation of the vehicle starting motor.

As shown in Fig. 1, I provide a compact and readily portable casing 5 upon the front of which is mounted the dial of a voltmeter 6 and a series of buttons for operating the control switches hereinafter described. Flexible, insulated leads 7 and 8 extend from the casing 5 and these leads are designed to transmit current at the maximum, normal rate of discharge of the batteries to be tested. A battery to be tested is indicated by the numeral 9. Also extending from the casing 5 along the leads 7 and 8 are relatively light wires 10 and 11. The wire 10 and lead 7 have their free ends secured to a clamp 12 for making electrical connection with one terminal of the battery 9 and the wire 11 and lead 8 are similarly connected to a clamp 13 for attachment to the other battery terminal. The clamps 12 and 13 are designed to make good electric connections with the battery terminals without removing the battery from the vehicle or disconnecting the vehicle cables from the battery.

In Fig. 3 the vehicle starting motor is indicated by the numeral 14, the starter switch by the numeral 15 and the cables for connecting the motor circuit to the battery by the numerals 16 and 17. Within the casing 5 I provide a discharge circuit which includes resistances 18, 19 and 20. The circuit also includes a wire 21 having branches extending to switches 22, 23 and 24 respectively. The resistances 18, 19 and 20 are included in series with the switch 22. The switch 23 controls a shunt for the resistance 18 and the switch 24 controls a shunt for both of the resistances 18 and 19. The lead 7 extends to the wire 21 and the lead 8 to one end of the resistance 20.

The values of the resistances 18, 19 and 20 are determined by the resistances of the starter circuits for motor vehicle engines of the three sizes in general use. The smaller engine batteries are designed to supply 160 amperes for the period required for the operation of the starting motor (at normal temperatures), while for a second, medium power group the standard starting rate is 180 amperes and for a third and higher power group 200 amperes are required to operate the starter. The resistances 18, 19 and 20 are such that the circuits respectively under control of the switches 22, 23 and 24 have total resistances corresponding to the resistances of the starting motor circuits respectively for the engines of the three common power groups described.

In connection with the discharge circuit described, I provide for voltage drop tests to determine whether a battery of any of the common capacities has adequate cranking power or whether it is worn out or discharged to the point where it must be discarded or repaired. The voltage drop across the battery terminals while the battery is discharging at its normal rate for starting is indicated by the meter 6. The range of this meter preferably corresponds approximately to the range of voltages between the worn out or discharged value of the battery voltage under the normal starter load and the fully charged value of the voltage under the same load. This range for ordinary automotive batteries is about one volt and the maximum voltage of the battery under the normal starter load is approximately 5.7 volts.

One simple method of providing the desired voltmeter range is illustrated in Fig. 3. A small primary battery 25 is disposed in the voltmeter circuit with the polarity reversed or opposed to that of the battery 9 to be tested. By furnishing a battery 25 having a normal voltage equal to that of the battery to be tested, less one volt, the entire range of the voltmeter 6 is utilized in making the tests and this results in an unusually accurate and plain indication of the voltage drop in each case. As best shown in Fig. 2, the voltmeter 6 has a pointer 26 connected to the moving system, which may be of any suitable or ordinary construction. The scale 27 of the voltmeter is calibrated with three major divisions, indicated, respectively by the numerals 28, 29 and 30, corresponding respectively to the voltage values of batteries discharged to the point where repair or replacement is necessary, to the values for partly charged batteries and for fully charged or full capacity batteries. The divisions 28, 29 and 30 are conspicuously marked with suitable legends and are distinctively colored to make the readings readily understandable by technically untrained observers, such as the ordinary owners or operators of motor vehicles. The voltmeter circuit also includes a fuse 31 for protecting the meter, a push button switch 32 and a meter resistance 33 of the correct value for the meter range desired. The switches 22, 23, 24 and 32 are preferably of the normally open or push button type and are so mounted on the casing 5 that their operating buttons are readily accessible on the front of the casing.

It will be evident that the wires 10 and 11 should be connected in each case to the correct terminals of the battery 9 to avoid impressing the sum of the electromotive forces of the batteries 9 and 25 on the low range meter 6. To facilitate making the lead connections with the proper terminals of the battery 9 the clamps 12 and 13 and leads 7 and 8 are conspicuously marked as by distinctive colors.

In operation the clamps 12 and 13 are usually applied to the battery terminals without disconnecting the vehicle cables 16 and 17. With these clamps secured to the proper battery terminals, the first test which is ordinarily applied is to measure the voltage of the battery while operating the vehicle starter. This is done by closing the starter switch 15 and holding it closed while the switch 32 is closed for a sufficient period to permit a reading of the meter 6. In this test the pointer 26 by reference to the meter scale 27 clearly shows the condition of the battery under the actual load when starting or attempting to start the engine. If this test indicates that the battery requires recharging or replacement a further test is made with my apparatus to determine whether the apparent deficiency of battery power is actually caused by a defect in the starter circuit or motor, or whether the deficiency is entirely or partially due to the weakness of the battery itself. This second test is made by merely closing one of the switches 22, 23 or 24 and then momentarily closing the switch 32 while the voltmeter reading is taken. The operator by observing the size of the vehicle engine determines which of the switches 22, 23 or 24 to close and closes the appropriate one while the switch 32 is closed to obtain the voltmeter reading. If this second test indicates that the battery with its normal or rated starting load has adequate power and the first test, under the actual starting load, indicated inadequate power, it follows that there is a defect in the starter motor or its circuit, whereas, if both tests indicate inadequate cranking power, it has been demonstrated that the battery itself requires recharging, repair or replacement.

It will be evident that my device affords unusually simple and inexpensive means for making quick, accurate and convincing tests of starter batteries as well as the starter motors and circuits. All guess work as to the proper discharge rates for batteries of the various power groups is eliminated by providing the fixed resistances 18, 19 and 20 in the discharge circuits under control of the simple push button switches. I also reduce doubts in the minds of the battery owners as to the accuracy of the tests by providing the voltmeter having its range limited to the range of voltages to be examined or scrutinized and having the easily understandable legends showing whether the battery in each case requires charging, repair or replacement.

Having described my invention, what I claim as new and desire to protect by Letters Patent is:

1. In apparatus for applying voltage drop tests to storage batteries in motor vehicle starter circuits, the combination of a discharge circuit adapted to be connected to a battery to be tested, said discharge circuit having resistance substantially equal to the normal resistance of said starter circuit, a voltmeter adapted to be connected across the battery terminals, said meter having a range substantially equal to the variation range of battery voltages required for the operation of the starter in said first mentioned circuit and being calibrated with legends to indicate without further reference the condition of a battery when being discharged at the rate determined by the resistance of said discharge circuit, and a battery in circuit with said voltmeter and connected in opposition to the battery to be tested for limiting the voltages impressed on said meter to the range of voltage variation required for the operation of said starter.

2. In apparatus for applying voltage drop tests to storage batteries in motor vehicle starter circuits having various resistances, a discharge circuit having leads adapted to be secured to the terminals of the battery to be tested, a series of fixed resistances, branches of said circuit each adapted to shunt at least one of said resistances, a series of manually operable switches severally controlling said branches, the total resistance of the circuits severally under control of said switches corresponding to the normal resistances of said starter circuits respectively and a voltmeter circuit disposed in parallel to said discharge circuit and including a voltmeter having a range substantially equal to the range of voltages of the batteries between full charge and weak condition and being calibrated with legends adapted to indicate to the observer the condition of a battery when discharging through the starter circuit and through the appropriate discharge circuit under control of one of said switches, and a battery included in said voltmeter circuit and connected in opposition to the battery to be tested for limiting the range of voltages impressed on said voltmeter to the range of battery voltages between full charge and weak condition.

STEPHEN S. BERRY.